Figure 1:
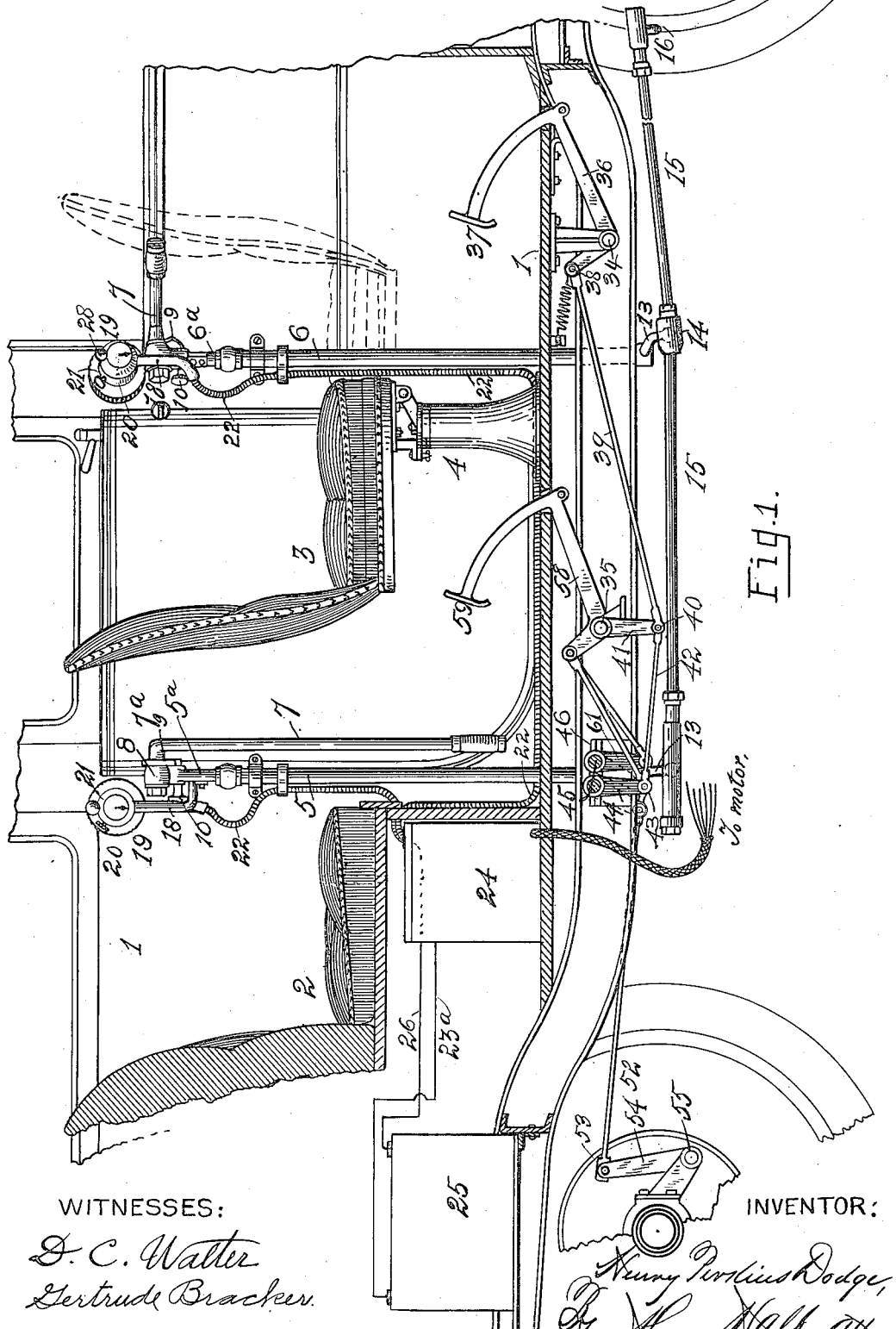

H. P. DODGE.
ELECTRIC AUTOMOBILE CONTROL.
APPLICATION FILED DEC. 12, 1913.

1,282,389.

Patented Oct. 22, 1918.
3 SHEETS—SHEET 1.

WITNESSES:
D. C. Walter
Gertrude Bracker.

INVENTOR:
Henry Perkins Dodge,
By Vernon Hall, Atty.

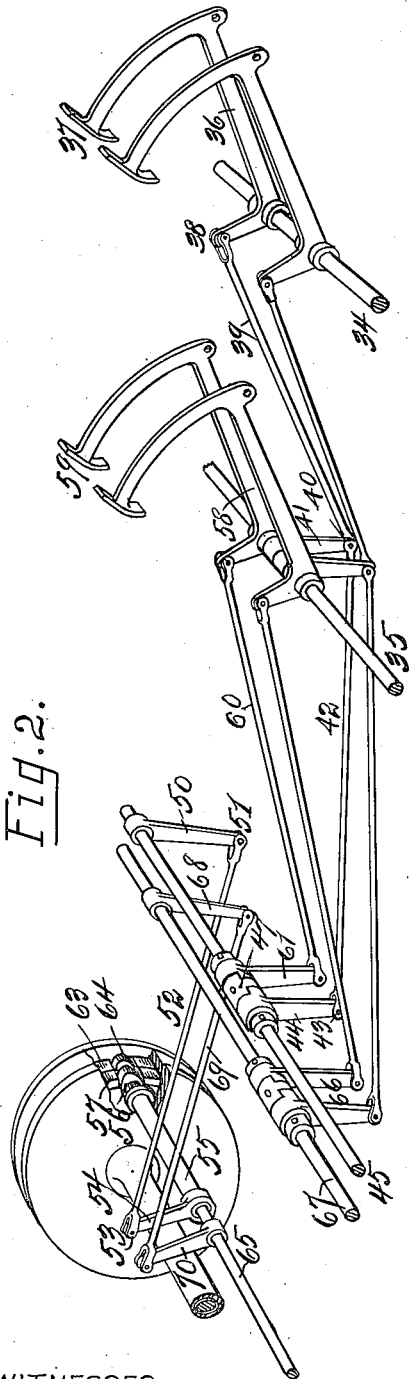

H. P. DODGE.
ELECTRIC AUTOMOBILE CONTROL.
APPLICATION FILED DEC. 12, 1913.
1,282,389.
Patented Oct. 22, 1918.
3 SHEETS—SHEET 3.
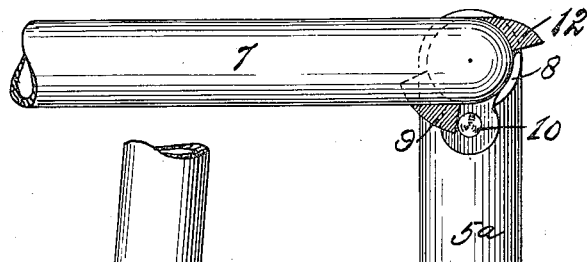
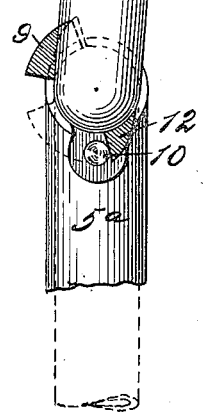
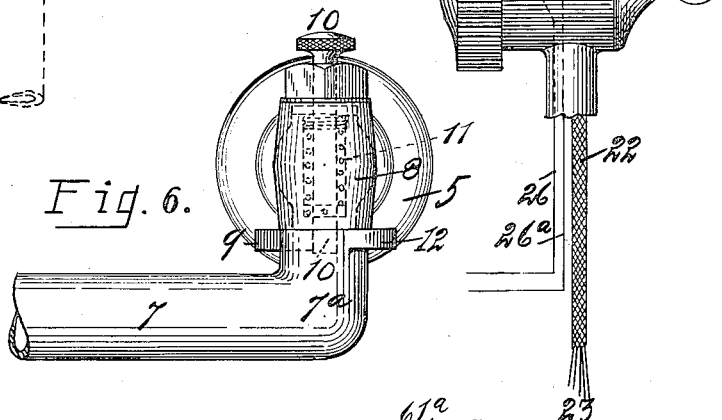
WITNESSES:
D. C. Walter
Gertrude Bracker
INVENTOR:
Henry Perkins Dodge,
By Munn Hall Atty.

UNITED STATES PATENT OFFICE.

HENRY PERKINS DODGE, OF TOLEDO, OHIO, ASSIGNOR TO THE OHIO ELECTRIC CAR COMPANY, OF TOLEDO, OHIO, A CORPORATION OF OHIO.

ELECTRIC-AUTMOBILE CONTROL.

1,282,389.                    Specification of Letters Patent.        Patented Oct. 22, 1918.

Application filed December 12, 1913. Serial No. 806,197.

*To all whom it may concern:*

Be it known that I, HENRY PERKINS DODGE, a citizen of the United States, residing at Toledo, in the county of Lucas and State of Ohio, have invented certain new and useful Improvements in Electric-Automobile Controls; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to electric carriages of the kind having front and rear seats, the vehicle being provided with controlling devices which may be operated from either the front or rear seat, and, with a view to safety and convenience, is designed to furnish an improved construction and arrangement of such controlling devices.

In the operation of these carriages in which the car is controlled from either seat, it is important, when the control is arranged to be operated from one of the seats, that it can not be interfered with by the handling of the controlling devices for the other seat. This prevents accident due to improper or accidental starting, stopping, reversing or speeding not contemplated by the operator of the car. The present invention relates in part to means for guarding against mishaps of the character here indicated.

In the control of vehicles of the character indicated it is necessary that the operator shall be able to apply the brake from either the front or rear seat. Ordinarily a single friction-brake will be found sufficient, but sometimes, especially in street traffic, emergencies arise in which a strong double-brake is found of great advantage. My invention is further designed to furnish for the driving wheels two brakes with means for actuating the same independently of each other or simultaneously from either the front or rear seat of the car as may be required.

I attain the objects above indicated by means of the devices, construction and arrangement of parts hereinafter described, and shown and illustrated in the accompanying drawings, in which—

Figure 1, is a side-elevation, taken in central longitudinal section, of a portion of an electric carriage provided with my controlling devices; Fig. 2, a perspective-view of the brakes and brake-control hereinafter described, detached; Fig. 3, a side-elevation of the connections between the steering-staffs, hereinafter referred to, and the steering arm of the front wheels, detached; Fig. 4, a side-elevation, on an enlarged scale, of the pivotal connection between one of the steering staffs hereinafter referred to and the steering lever which actuates the same; Fig. 5, the same showing the steering lever lifted into upright position and out of the way; Fig. 6, a top plan-view of the same disposed as in Fig. 4; Fig. 7, an enlarged-view of one of the shafts, hereinafter referred to, through which the movement of two brake-pedals is communicated—independently of each other—to one of the brakes, the sleeves on the said shaft being drawn aside from engagement with the collar fixed on said shaft to better disclose the form and arrangement of the parts; Fig. 8, a side-elevation, partly in section, of the electric controller hereinafter referred to,—of which there are two,—illustrating the device by which one of the electric controllers is rendered electrically inoperative and is locked in such position, and at the same time rendering electrically operative the other electric controller, and Fig. 9, a vertical central sectional longitudinal elevation of the universal joint hereinafter referred to.

Like numerals of reference indicate corresponding parts throughout the drawings.

In the drawings, 1 is the body of an electric carriage in the interior of which, across its rear portion, is a seat 2, and near its front part are two seats one of which is shown at 3. This seat is swiveled on pedestal 4 so that it may be turned into the position indicated by the dotted lines. 5 and 6 are upright steering posts located forward of the seats 2 and 3 and near the left side of the carriage. These posts are tubular, and down through the center of these tubes, extend steering staffs 5ª—6ª. These are arranged to rotate horizontally and at their lower ends are connected with steering devices hereinafter to be described. At top the staffs 5ª—6ª each carries a steering lever 7, one end of which is bent at about a right angle, to form an arm, as at 7ª. These are journaled, as at 8, in such manner that the lever may be swung in a vertical plane in front of its seat, with the free end of the lever turned either up or down or in horizontal position. The position of the seats in relation to the steering posts and steering levers is such that when the front seat 3 is turned to face forward, the back of this seat so interferes with the rear steering lever that when it is placed in operative position it can not be operated to steer the carriage, and when the seat 3 is turned to face backward, as indicated by the dotted lines in Fig. 1, the back of the seat so interferes with the forward lever that it can not be used to steer the vehicle. Thus it will be seen that when the operator occupies the front seat, facing forward, a passenger occupying the rear seat can not improperly guide the machine, and that when the operator occupies the rear seat with the passenger occupying the front seat facing backwardly the passenger can not now obstruct the proper guidance of the car.

The arm of the steering lever near the bend 7ª is provided with a radially projecting lug 9. Through the staff 5ª near its top passes horizontally a pin 10 held pressed normally inwardly by a spring 11, (see Fig. 6,) the inner end of which projects into the path of the lug 9, forming a stop which supports the steering lever in horizontal position as shown in Figs. 4 and 6. Upon the arm of the lever 7 and in the same plane with and nearly opposite to the lug 9 is a lug 12. When the pin 10 is partly withdrawn, out of the path of the lugs 9—12, the steering lever may be permitted to drop and hang vertically or the lever may be lifted into upright position, slightly beyond the vertical,—as illustrated in Fig. 5—where, by means of the stop 10—12 and its own weight, it will remain out of the way but within convenient reach when required.

Each of the steering staffs 5ª—6ª is provided at its lower end, beneath the floor of the car, with a horizontal arm 13, the outer end of which is engaged by means of a ball and socket joint 14 with a drag-link 15 leading to and connected with the steering knuckle 16 of the forward pair of wheels. The drag-link 15 is formed in two sections, swiveled together as at 17, (see Fig. 9,) to facilitate the ready and convenient adjustment and alinement of the several connected parts illustrated in Fig. 3, and to accommodate the movements of the steering staff to the movements of the chassis of the car.

At the top of each of the steering staffs is an upright bracket 18 upon the top of which is mounted and secured an electrical controller 19. This controller may be of the usual or any preferred kind, but is preferably of the sort described in the United States Patent for controller for electric automobiles, granted to me December 7, 1909, No. 942,488. Since a specific controller forms no part of the present invention, it need not be here described in detail, but it should be understood that it is provided with a case 20, having in its interior a series of contact points and electrical make-and-break devices corresponding to the requisite speeds ahead and backward, and has a revoluble disk 21 which actuates the respective make-and-break devices. A cable 22 leads from each of the controllers and contains wires 23 corresponding to the various speeds required. These wires are in the control circuit and lead respectively from corresponding contact points in the controllers to contacts in the contactor box 24. These contacts control the various resistances in the motor circuit in a manner which will be understood and which need not be here further explained. From the contacts in the contactor box the lines 23 lead through a common wire 23ª to one side of the battery 25. From the other side of the battery leads line 26 through the cables 22 to one of the controllers 20,—say the forward one— thence back, to the rear controller through line 26ª. The line 26 leading to the forward controller may, through the movement of the disk 21, be connected with either of the wires 23, the line 26ª leading from the front to the rear controller is normally open at 27 in the front controller-box but may be closed by a switch-plug 28. When the disk 21 is in neutral position and the plug is introduced to close the line 26ª, the plug enters a socket 30 in the inner side of the disk and prevents the disk from being turned. Now while the front controller is rendered inoperative, the rear controller is thrown into circuit and becomes operative so that so long as the plug 28 is in closed position the car can only be controlled from the rear seat and when the plug is withdrawn the car can be controlled only from the front seat.

To prevent the accidental or improper withdrawal of the plug 28 the controller-case contains a lock the bolt of which, 31, may, by means of key 32, be caused to engage an annular groove or notch 33 on the plug.

In order that a single or double brake may be applied from either the front or rear seat and independently of each other or simultaneously, as may be required, I provide the brake-mechanism now to be described: 34 and 35 are shafts fixed transversely beneath the floor of the car. 36 is a bell-crank lever fulcrumed upon the shaft 34, carrying at one end an arm which extends up through the floor of the carriage and having at its upper extremity a pedal 37. This is one of the brake-pedals for the front seat of the vehicle. The other end of this bell-crank lever is connected as at 38 with the forward end of a rod 39, the rear end of which is pivotally connected, as at 40, with the lower end of an arm 41 journaled on the shaft 35. There is also pivotally connected with the lower end of the part 41 the forward end of a rod 42 which may be regarded as a continuation of the rod 39, and which at its rear end is pivotally connected, as at 43, with the lower end of an arm 44 journaled loosely on shaft 45. This shaft extends transversely beneath the floor of the car and is journaled in bearings indicated at 46. Fixed upon the shaft 45 is a collar 47 having at one end a segmental lug or shoulder 48 which lies in the path of and contacts with a corresponding lug 49 on the sleeve 44ª, forming part of the arm 44, and which is loose upon the shaft 45. Depending from and fixed to the shaft 45 is an arm 50 to the lower end of which is pivotally connected as at 51 the forward end of a rod 52. This rod at its rear end is pivotally connected as at 53 with an arm 54 fixed upon one end of a tubular shaft 55, the other end of which carries a cam 56 arranged by its partial rotation to expand the friction-brake 57. Loose upon the shaft 35 is a bell-crank lever 58 carrying at one end a pedal 59 which is disposed in operative relation to the rear seat of the carriage and which, through rod 60, is connected with arm 61 journaled by means of its sleeve 61ª loosely upon shaft 45. The sleeve 61ª is provided with a segmental lug 62 arranged to contact with a corresponding lug 48ª rigidly connected with the end of the collar 47 opposite the lug 48. It will be seen that the depression of the pedal 37 will, through the rods 39 and 42 and the arm 44, cause a part turn of the shaft 45 thus swinging the arm 50 so that, through the rod 52 and the lever 54, the tubular shaft 55 is rotated, thus setting the brake 57. It will also be seen that the depression of the pedal 59 through its rod 60 and arm 61 will in like manner swing the arm 50 and set the brake 57 and that the operation of these two pedals 37 and 59 are entirely independent of each other.

63 is a second brake actuated by cam 64 on the end of shaft 65 which passes through the tubular shaft 55. For the second brake, 63, there is a front and a rear pedal mounted upon the shafts 34 and 35 and connected through rods with arms 66 loose on shaft 67 and through a collar, like collar 47, with arm 68 and rod 69. This rod actuates arm 70 fixed on the shaft 65, the second set of pedals and the second brake being mounted, connected and actuated in the same manner as hereinbefore described as to the brake 56. It will now be seen that either of the two front or rear pedals may be actuated singly and independently of either of the other pedals or, if necessary, any two or three or four of the pedals may be operated together.

From the foregoing description, it will now be apparent that my vehicle may be operated from either the front or rear seat; that when the operator occupies one of these seats, the steering arm of the other seat may be raised or lowered out of the way; that when the front seat is turned forwardly the rear steering lever can not be operated; that when the front seat is turned rearwardly, the front steering arm can not be operated; that the electrical controller is safeguarded by a switch-lug and lock which prevents the improper or accidental use of the electrical controller, and that the two separate brakes for the vehicle may be actuated independently of each other or simultaneously from either the front or the rear seats.

Having described my invention, what I claim and desire to secure by Letters Patent, is—

1. In a vehicle of the character described, a front seat, a rear seat, a steering-staff disposed adjacent to each of said seats, pivotally connected with each of said staffs a steering lever, and means for detachably supporting said levers respectively in operative position, the arrangement being such that the front seat may be swung into interference with either of said handles.

2. In a vehicle of the character described, a front seat adapted to face forwardly or backwardly, a rear seat, front and rear steering-staffs disposed in operative relation to said seats, movably secured to each of said staffs a steering lever, and stops adapted to detachably engage and support said levers in operative position, the front seat being adapted to swing into interference with the operation of the front lever.

3. In a vehicle of the character described, a front steering lever, a rear steering lever, a seat disposed between said two levers and adapted to swing into the path of either of said levers.

4. In a vehicle of the character described, a front seat adapted to face either to the front or rear, a rear seat, a steering lever disposed adjacent to each of said seats and movably supported to swing into or out of operative position, said front seat being positioned when facing forward to lie in the path of the rear lever.

5. In a vehicle of the described character, a steering-staff having pivotally connected to its top a steering lever and having at its lower end a horizontal arm, a drag-link having end-to-end sections, and a single ball-and-socket joint operatively uniting the meeting ends of said arm and said link-sections.

6. In an electric vehicle having a front seat and a rear seat, controlling means for such vehicle, comprising, in combination, a steering lever operable from the front seat, a steering lever operable from the rear seat, said front seat being adapted to swing into interference with the movement of either of said levers, an electric controlling device adjacent to the rear steering lever, an electric controlling device adjacent to the front steering lever, means for limiting the operativeness of such controllers to a single selected one of said controllers, two brake-levers for the forward seat, two brake-levers for the rear seat, two brakes, and connections whereby said several brake-levers may be actuated singly and independently of each other, and whereby any two or more of said brake-levers may be actuated simultaneously.

7. In a vehicle of the character described, a front seat, a rear seat, means for the electrical control of said vehicle from either of said two seats, and devices which limit the operativeness of said controlling means to one selected seat, combined with a brake mechanism operable from either of said two seats.

8. In a control for a vehicle of the described character, a front and a rear seat, a front steering-staff, a rear steering-staff, a steering lever movably connected with each of said staffs and adapted to swing into and out of operative position, means for detachably supporting said levers in operative position, a support for said front seat which permits it to face either forwardly or backwardly and to move into and out of interference with the movement of either of said levers, a controller corresponding to each of said two seats, and devices which prevent the simultaneous operation of said controllers.

9. In a control for a vehicle of the described character, a front and a rear seat, a front steering-staff, a rear steering-staff, a steering lever movably connected with each of said staffs and adapted to swing into and out of operative position, means for detachably supporting said levers in operative position, a support for said front seat which permits it to face either forwardly or backwardly and to move into and out of interference with the movement of either of said levers, and a controller mounted in operative relation to each of said two seats, combined with a brake-mechanism and independent means for actuating the same from either of said seats.

10. In a motor vehicle, the combination with a plurality of seats, one of said seats being relatively fixed and the other movable, of similar controlling devices for said vehicle disposed adjacent to said seats, respectively, the position of said movable seat affecting the operability of said devices.

11. A vehicle having vehicle controlling mechanism and provided with forward and rear seats from either of which the controlling mechanism is to be controlled, and a controlling handle individual to each of said seats, the handle at the forward seat being mounted to permit it to have operating and non-operating positions, this seat being adjustably mounted to permit it to have forward and rear facing positions and serving when in a rear facing position to obstruct movement of the controlling handle from a non-operating to an operating position.

In testimony whereof I affix my signature in presence of two witnesses.

HENRY PERKINS DODGE.

Witnesses:
   Geo. B. Orwig,
   Gertrude Bracken.